Sept. 23, 1958     A. D. FREIBERG     2,853,044
SCORE BOARD
Filed July 1, 1955     2 Sheets-Sheet 1
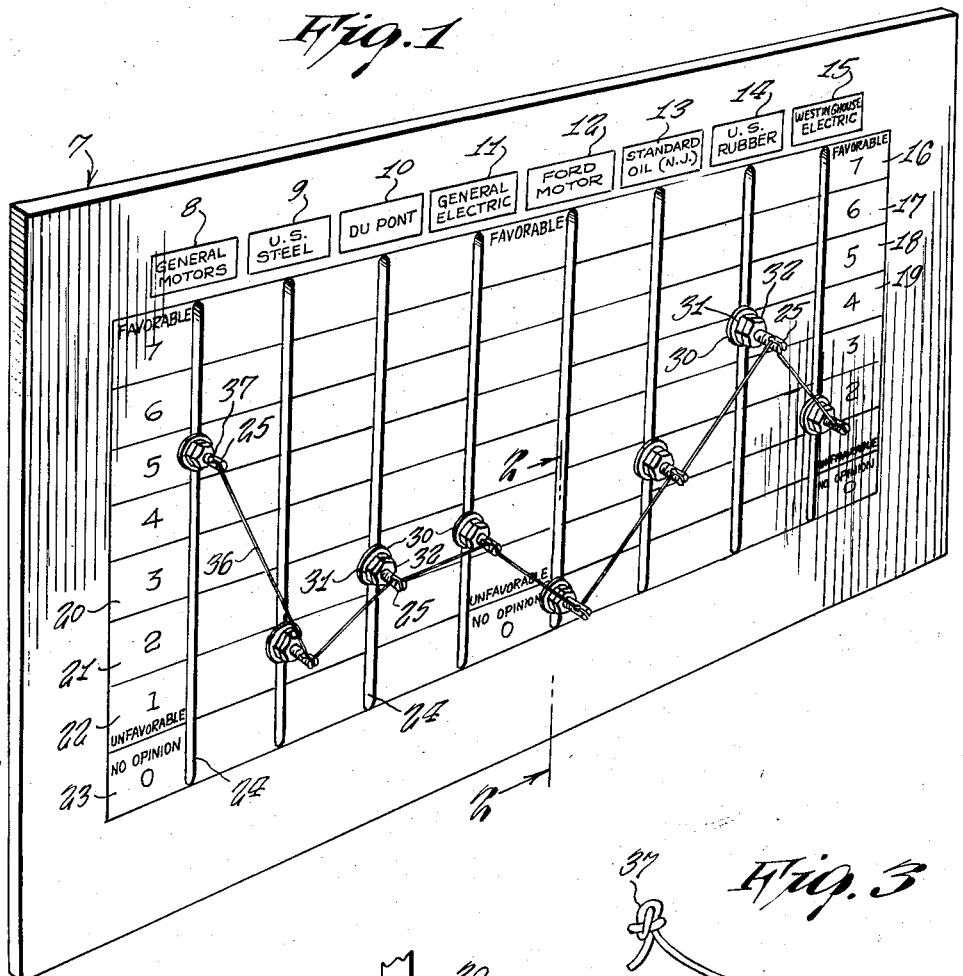
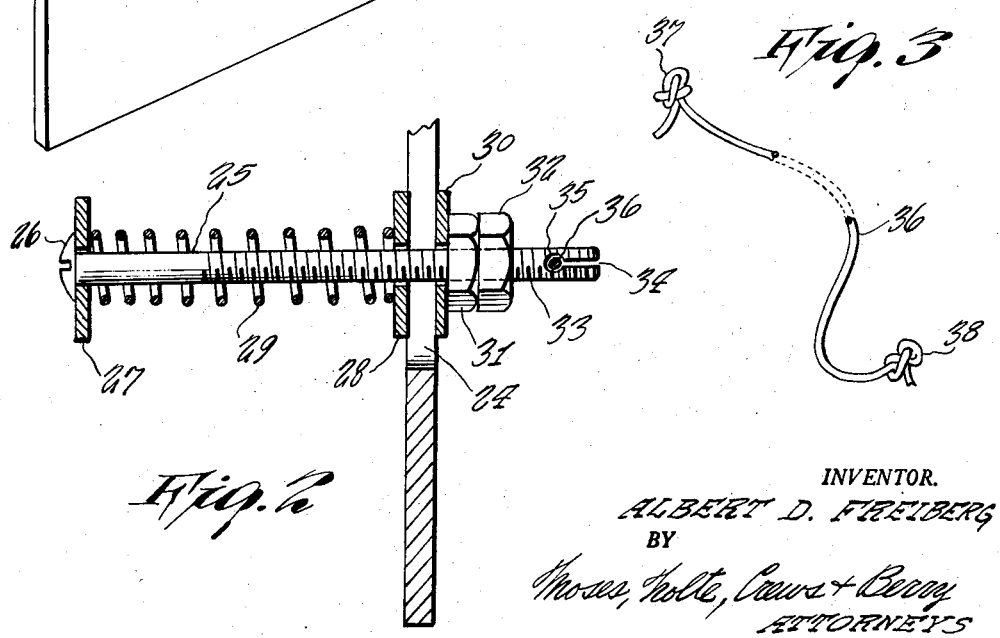
INVENTOR.
ALBERT D. FREIBERG
BY
Moses, Nolte, Crews + Berry
ATTORNEYS

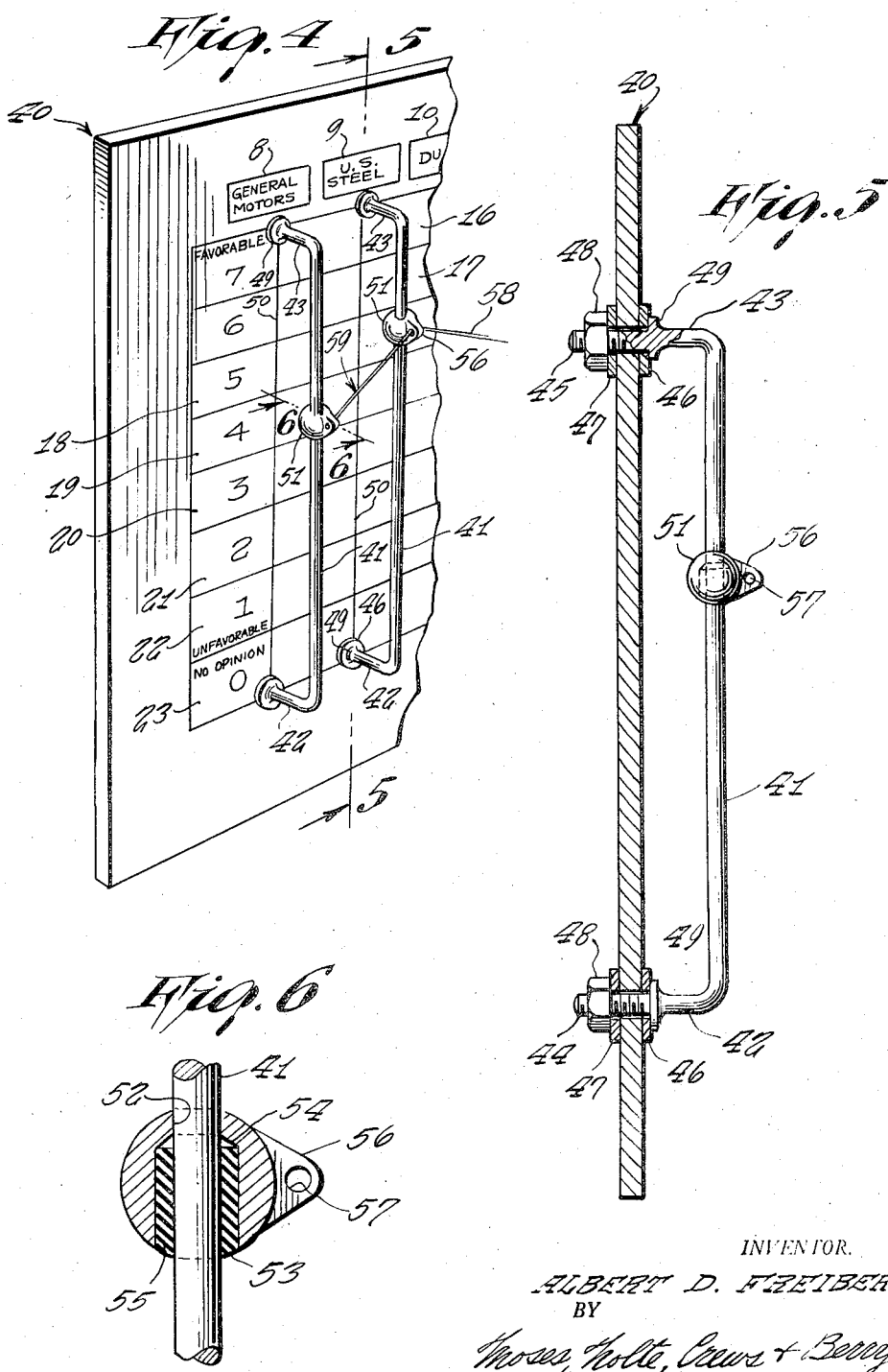

ent Office 2,853,044
Patented Sept. 23, 1958

2,853,044

SCORE BOARD

Albert D. Freiberg, Greenwich, Conn.

Application July 1, 1955, Serial No. 519,558

1 Claim. (Cl. 116—135)

This invention relates to charts and score boards and the like, and particularly to a special score board.

The main object of my invention is to provide a chart or score board listing, for example, commodities or industries and having means for visually rating individual commodities or industries and thereby automatically producing a resultant curve or the like.

Another object of this invention is to have such a chart or score board having the commodities or industries or other subjects of note assigned to individual columns on the board and also provided with individually movable indicators or the like for these columns adapted to be manually shifted to various positions in their respective columns to indicate individual opinions of the subjects for said columns.

An ancillary object is to have such a score board provided with elongated guide means individually assigned to each commodity or industry column and having the indicators shiftable along these guide means to desired locations along the same at will, with the indicators capable of individually retaining their attained positions.

A further object is to have such a score board provided with a plurality of shiftable indicators as already outlined, which are connected into a series across the board by a flexible cord or the like in full view of the working face of the board.

It is also an object of the invention to have the elongated guide means for the shiftable indicators susceptible of variation in several forms without in any way departing from the invention.

Other objects and advantages of my invention will appear in greater detail as the specification proceeds.

In order to facilitate ready comprehension of this invention for a proper appreciation of the salient features thereof, the invention is illustrated on the accompanying drawings forming part hereof, and in which:

Figure 1 is a perspective view of score board made according to the invention and embodying the same in a practical form;

Figure 2 is a fragmentary vertical section taken on line 2—2 in Figure 1;

Figure 3 is a view of the curve cord of the invention when dissociated from the score board;

Figure 4 is a fragmentary perspective view of a modification of the score board of Figure 1;

Figure 5 is a vertical section of the same score board as taken on line 5—5 in Figure 4; and Figure 6 is an enlarged sectional detail as taken on line 6—6 in the same Figure 4.

Throughout the views, the same reference numerals indicate the same or like parts and features.

In the business world, it is frequently desirable to have a visual index of opinion in order to make profitable decisions. In order to meet such actual needs, I have designed a special score board which automatically indicates, in a visible curve, the various opinions or values.

Hence, in the practice of my invention, and referring also again to the drawings, a score board panel, generally indicated at 7 has a horizontal series of industries or commodities listed in individual boxes or panels 8, 9, 10, etc., to 15, for example, while the board is provided further with a series of horizontal subdivisions 16, 17, 18 to 23. At the extreme right as well as at the extreme left, these subdivisions are numbered from 0 to 7, inclusive, with the uppermost space in each case being further noted with the word "Favorable" and the bottom space at 0 is similarly noted "No opinion," and further, the second space from the bottom in each case which is numbered 1 is noted "Unfavorable."

The score board is thus subdivided into horizontal wide spaces that have a horizontal series of captions above for a purpose that is now to be explained. Beneath each square or caption 8, 9, etc., is a vertical slot 24 cut through the board and extending in each case from the uppermost horizontal space noted 7 down through the bottom space noted 0, these slots being equidistantly spaced apart when the captions above allow it, although this feature is not essential in all cases. In any event, the horizontal spaces are thus vertically crossed by the slots which allow the various spaces to be individually selected along each slot. This is accomplished by insertion into each slot 24 of a machine screw or bolt 25, having a head 26, a pair of washers 27, 28 spaced a distance apart with a compression spring 29 on the shank of the screw between these washers. The screw extends through slot 24 with washer 28 pressed against the rear surface of the score board, while upon the front surface of the board is a further washer 30 retained on the screw shank by a nut 31 with a lock nut 32 screwed up tight on the thread 33 against the first nut 31 to lock the latter in place. The screw 25 is thus retained in place at any point along slot 24 by friction between washers 27 and 28 under pressure of spring 29, but may be manually slid up or down along the slot 24 to any space position from 0 at the bottom to 7 at the top. These numbers are more or less arbitrary, and thus the spaces could be fewer or more with correspondingly fewer or more numbers than now shown.

The screws or bolts 25 are all the same in construction and arrangement in slots 24 and are, of course each independently shiftable without regard to the rest at all times. However, for the purpose of this invention, each screw has the shank thereof formed with an end slot 34 extending a short distance inward and terminating in a transverse hole 35. Through the series of holes 35 in all of these screws is threaded a more or less elastic cord 36 having a knot 37 at one end at the first screw of the series at the left, and a second knot 38 following the last screw of the series at the right. In each case, the end slot may serve to allow insertion of the cord when assembling the score board originally, or when the cord has been worn and requires replacement.

The arrangement is such that when each screw or indicator 25 is manually shifted along its vertical slot 24 to locate at the particular space corresponding to the side number 0 to 7 indicating an opinion value of the company or commodity, the cord 36 automatically displays a visual curve generally indicated at 39 showing, as it were a picture of opinion at the moment in this field. With the changes that may thereafter be made in the positions of the indicators 25, the curve 39 will obviously assume a different outline to indicate the latest opinion.

The score board 7 has been described as having vertical guide slots 24 for the indicators 25, but I may use other guide means and indicators serving the same purpose, as, for example shown in Figures 4, 5 and 6. The score board generally indicated at 40 has the captions 8, 9, etc., as before in reference to board 7, as well as the horizontal spaces 16 to 23 and provided with side numbers 0 to 7 inclusive. Instead of the slots 24, the board 40 is provided with a series of vertical guide rods 41, 41, etc., each having an inwardly bent lower end 42 and a similar inwardly bent upper end 43, both bent ends being directly secured to the board, having threaded portions 44 and 45 extending through washers 46, 46, the board proper 40, further washers 47, 47 and having nuts 48, 48 screwed thereon to secure these ends in place. In order to moke the attachment of the rods more secure, the upper and lower ends have stop flanges 49, 49 against which washers 46 engage, and as the board is clamped between washers 46 and 47, the bent ends 42 and 43 of these rods are rigidly held in position. In this board 40, the spaces 16 to 23 are divided vertically by lines 50, 50 aligned with the guide rods 41 and directed at the top toward the intermediate portion of each box 8 or 9, etc.

Upon each guide rod 41 is mounted a slidable and substantially spherical indicator 51 having a hole 52 loosely fitting the rod, while from below, the indicator is counterbored at 53 to form a cylindrical chamber 54. This chamber is adapted to receive a friction sleeve 55 fitting the rod with a predetermined amount of friction to impede sliding of the indicator along the sleeve and effective to retain this indicator in any attained position thereon, while allowing deliberate manual shifting of the indicator up or down on the rod. The indicators may be made of any suitable material, such as metal, wood, plastic or any other desired, while the friction sleeve may consist of metal, rubber or any plastic or flexible material.

Each indicator is provided with a forwardly projecting lug 56 having a hole 57 therein for the curve cord 58 that is passed through all of the indicator lugs 56. This cord is preferably more or less elastic so that it, like cord 36 of board 7 will allow extreme movement or adjustment of the indicators and yet will extend without any slack between any two indicators to form the desired curve, as indicated at 59. The indicator could well have some other form, if desired, for the principle remains the same, so long as the elastic cord interconnects the indicators in a connected series and the cord extends to one end of this series to the other and makes it instantly possible to note the curve outline as a whole upon the score board after all indicators have been shifted to correct individual positions.

It is apparent from the foregoing that "opinions profiles" may be obtained on, for instance, toothpaste taste, on value, or what is most apt to be bought.

I have described what I believe to be the best embodiments of my invention. I do not wish, however, to be confined to the embodiments shown, but what I desire to cover by Letters Patent is set forth in the appended claim.

Having now fully described my invention, I claim:

An automatic curve score board of the character described including a score board panel having a plurality of captions indicating commodities, branches of industry and the like arranged in a horizontal series at the head of the panel and a vertical series of numbered horizontal space portions marked across the length of the panel, a plurality of substantially vertical elongated guide means upon the panel individually assigned to the captions and extending downwards therefrom, indicator means individually shiftable with respect to the elongated guide means, said indicator means including in each case an adjustable indicator movable beneath each caption shiftable along one of the guide means to be located at any numbered space portion in the vertical series at will, each indicator including means for retaining it in attained position along its guide means, said elongated guide means including a plurality of guide rods disposed in spaced parallelism to the surface of the panel with the two ends of each guide rod extending toward and being secured to said panel, the indicator associated with each guide rod including a movable member slidably mounted on the rod, said member having a frictional sleeve within the outline thereof fitting said rod in frictional contact therewith, an aperture in said movable member and a flexible cord extending through said aperture in effective position to support said cord in full view before the panel, each indicator including a compact generally spherical member and wherein a lug projects integrally from the latter and has the cord aperture extending transversely therethrough.

References Cited in the file of this patent

UNITED STATES PATENTS

| 531,726 | Humes | Jan. 1, 1895 |

FOREIGN PATENTS

| 434,985 | Italy | May 7, 1948 |
| 275,278 | Switzerland | Aug. 1, 1951 |
| 56,763 | France | Oct. 6, 1951 |